(12) United States Patent
Zhang

(10) Patent No.: US 9,643,633 B2
(45) Date of Patent: May 9, 2017

(54) FRONT WHEEL FOLDING STRUCTURE OF THREE-WHEELED CART

(71) Applicant: Ningbo Wentai Sport Equipment Co., Ltd., Ningbo (CN)

(72) Inventor: Sheng Zhang, Ningbo (CN)

(73) Assignee: NINGBO WENTAI SPORT EQUIPMENT CO., LTD., Ningbo (CN)

( * ) Notice: Subject to any disclaimer, the term of this patent is extended or adjusted under 35 U.S.C. 154(b) by 93 days.

(21) Appl. No.: 14/792,642

(22) Filed: Jul. 7, 2015

(65) Prior Publication Data

US 2016/0185372 A1     Jun. 30, 2016

(30) Foreign Application Priority Data

Dec. 26, 2014   (CN) ..................... 2014 2 0849288 U

(51) Int. Cl.
    *B62B 3/02*           (2006.01)
    *B62B 3/12*           (2006.01)
    *A63B 55/60*         (2015.01)

(52) U.S. Cl.
    CPC ................. *B62B 3/02* (2013.01); *B62B 3/12* (2013.01); *A63B 55/60* (2015.10); *B62B 2202/404* (2013.01); *B62B 2205/12* (2013.01); *B62B 2205/18* (2013.01)

(58) Field of Classification Search
    CPC .. B62B 3/02; B62B 3/022; B62B 3/12; A63B 55/60
    IPC ..................................... B62B 3/02,3/022, 3/12
    See application file for complete search history.

(56) References Cited

U.S. PATENT DOCUMENTS

| 863,972 | A | * | 8/1907 | Ehlers | ..................... | B62B 3/007 280/39 |
| 6,719,319 | B2 | * | 4/2004 | Liao | ....................... | B62B 1/045 280/62 |
| 7,712,843 | B2 | * | 5/2010 | Wu | ......................... | B60B 3/001 280/47.17 |
| 7,770,912 | B2 | * | 8/2010 | Liao | ......................... | B62B 3/02 280/62 |
| 8,128,104 | B2 | * | 3/2012 | Liao | ......................... | B62B 3/02 280/38 |
| 8,191,920 | B2 | * | 6/2012 | Zhang | ...................... | B62B 3/02 280/47.26 |
| 8,474,833 | B2 | * | 7/2013 | Shapiro | ..................... | B62B 7/06 280/43 |

(Continued)

*Primary Examiner* — J. Allen Shriver, II
*Assistant Examiner* — Steve Clemmons
(74) *Attorney, Agent, or Firm* — Matthias Scholl, PC; Matthias Scholl

(57) ABSTRACT

A front wheel folding structure of a three-wheeled cart, including: a pipe sleeve of a front wheel rack, a rotational joint, a first joint base, a second joint base, and a locking mechanism. The first joint base and the second joint base are symmetrically disposed at two sides of the rotational joint. The locking mechanism is configured to lock the rotational joint. The rotational joint is coupled to the first joint base and the second joint base. The rotational joint includes a front part and a rear part, and the front part is adapted to rotate in relative to the rear part. The front part of the rotational joint is connected to the pipe sleeve of the front wheel rack and is sleeved with a first gear, and a second gear is disposed in the inner side of the first joint base and is engaged with the first gear.

4 Claims, 6 Drawing Sheets

(56) References Cited

U.S. PATENT DOCUMENTS

| | | | |
|---|---|---|---|
| 8,500,140 B1* | 8/2013 | Liao | B62B 7/10 |
| | | | 280/38 |
| 8,979,098 B2* | 3/2015 | Wang | B62B 3/022 |
| | | | 280/39 |
| 2004/0104057 A1* | 6/2004 | Yeh | B62B 5/0026 |
| | | | 180/19.1 |

* cited by examiner

FRONT WHEEL FOLDING STRUCTURE OF THREE-WHEELED CART

CROSS-REFERENCE TO RELATED APPLICATIONS

Pursuant to 35 U.S.C. §119 and the Paris Convention Treaty, this application claims the benefit of Chinese Patent Application No. 201420849288.5 filed Dec. 26, 2014, the contents of which are incorporated herein by reference.

BACKGROUND OF THE INVENTION

Field of the Invention

The invention relates to a front wheel folding structure of a three-wheeled cart.

Description of the Related Art

Typically, the folding process of a three-wheeled cart includes first flattening the front wheel and then folding the flattened front wheel. The process involves two steps and the operation is complex.

SUMMARY OF THE INVENTION

In view of the above-described problems, it is one objective of the invention to provide a front wheel folding structure of a three-wheeled cart that features simple structure and convenient operation.

To achieve the above objectives, in accordance with an aspect of the invention, there provided is a front wheel folding structure of a three-wheeled cart, comprising: a pipe sleeve of a front wheel rack, a rotational joint, a first joint base, a second joint base, and a locking mechanism; wherein the first joint base and the second joint base are symmetrically disposed at two sides of the rotational joint; the locking mechanism is configured to lock the rotational joint; the rotational joint is coupled to the first joint base and the second joint base; the rotational joint comprises a front part and a rear part, and the front part is adapted to rotate in relative to the rear part; the front part of the rotational joint is connected to the pipe sleeve of the front wheel rack and is sleeved with a first gear, and a second gear is disposed in an inner side of the first joint base and is engaged with the first gear.

In a class of the embodiment, the locking mechanism comprises a pull handle disposed on the rotational joint, a bayonet pin fixed on the pull handle, and a fixture block disposed at a front end of the pull handle; two ends of the bayonet pin are clamped on the first joint base and the second joint base, respectively; a clamping groove is provided at a rear end of the pipe sleeve of the front wheel rack, and the fixture block is clamped in the clamping groove; a screw is fixed on the rotational joint, the pull handle comprises a strip hole, and the screw is received by the strip hole and is adapted to move in the strip hole.

In a class of the embodiment, the pull handle comprises a spring; a front end of the spring abuts against an inner wall of the pull handle, and a tail end of the spring abuts against the screw.

In a class of the embodiment, the rotational joint is coupled to the first joint base and the second joint base via a bolt; the first gear is sleeved with a first base cover and a second base cover; the first base cover is disposed at a front part of the first gear, and the second base cover is disposed at a rear part of the first gear.

Advantages of the front wheel folding structure of a three-wheeled cart are summarized as follows. The front part of the rotational joint is adapted to rotate in relative to the rear part, the front part of the rotational joint is connected to the pipe sleeve of the front wheel rack and is sleeved with the first gear, and the second gear is disposed in the inner side of the first joint base and is engaged with the first gear. For the three-wheeled cart, the first joint base and the second joint base are connected to the lower frame, and the pipe sleeve of the front wheel rack is connected to the front wheel assembly. When the front wheel assembly is in an unfolded state, the locking mechanism locks the rotational joint, and the rotational joint, the first joint base and the second joint base are relatively fixed. To fold the front wheel assembly, the locking mechanism unlocks the rotational joint. The rotational joint rotates in relative to the first joint base and the second joint base. Rotate the pull handle, the first gear, the pipe sleeve of the front wheel rack, and the front wheel assembly all turn 180 degrees and are folded under the lower frame. In the process of turning, the engaged teeth of the first gear and the second gear are shifted, and the rotation of the first gear drives the front part of the rotational joint, the pipe sleeve of the front wheel rack, and the front wheel assembly to rotate. When the front wheel assembly is folded, the front wheel is parallel to the lower frame. The front wheel assembly is basically one-step folded and flattened, thereby simplifying the operation and improving the efficiency.

DETAILED DESCRIPTION OF THE EMBODIMENTS

Figure 1:
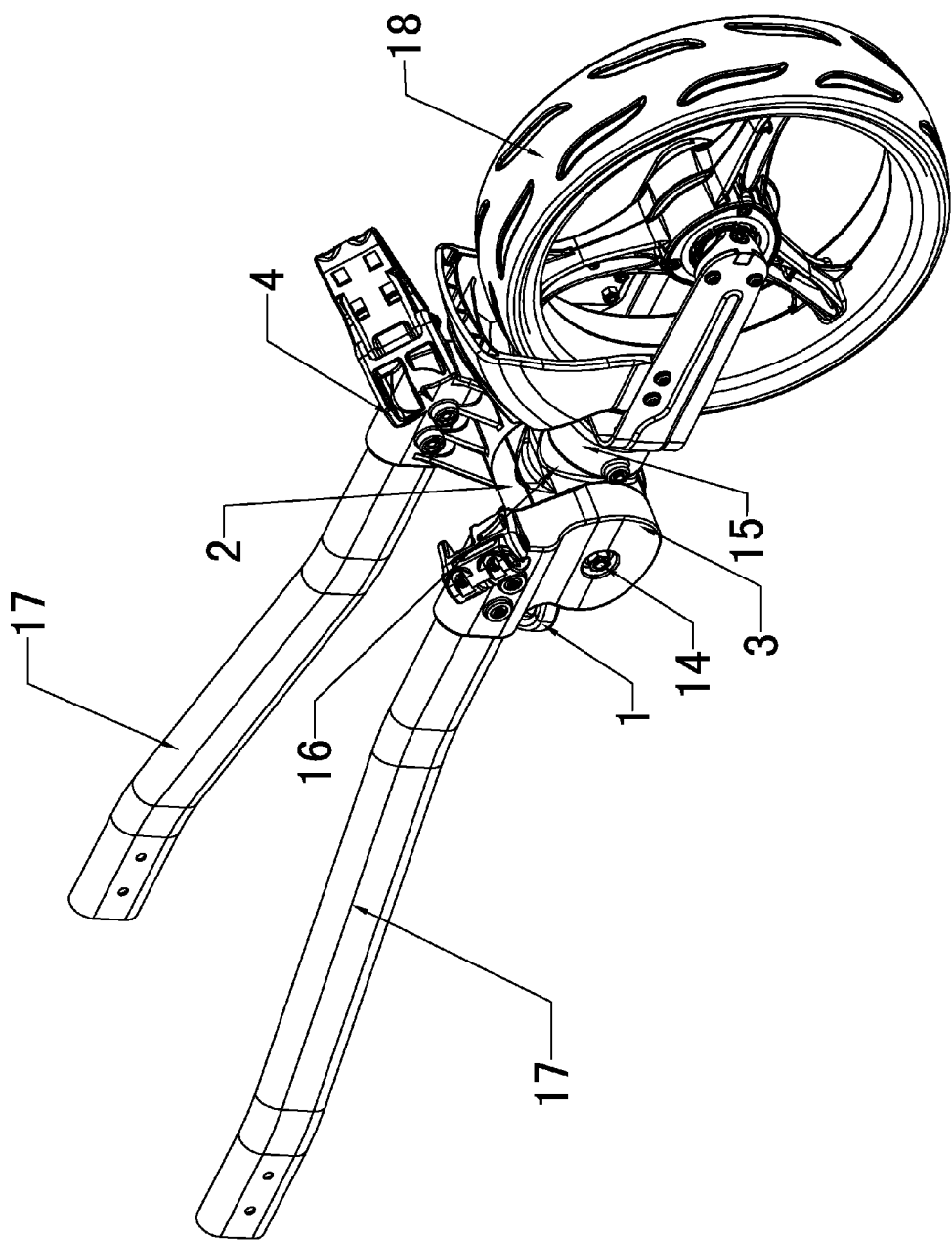
FIG. 1 is a stereogram of a front wheel folding structure of a three-wheeled cart in accordance with one embodiment of the invention.
Figure 2:
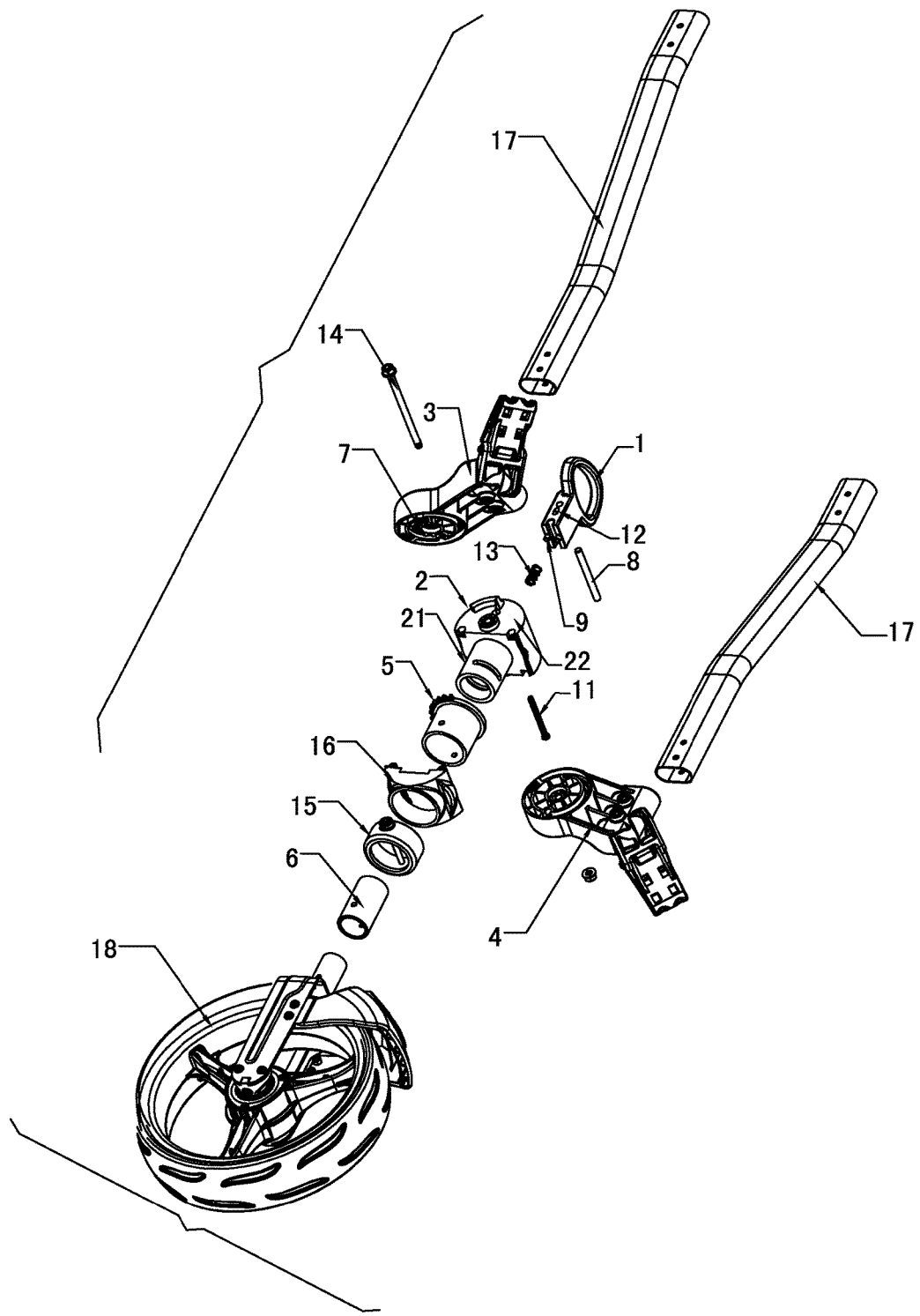
FIG. 2 is an exploded view of a front wheel folding structure of a three-wheeled cart in FIG. 1.
Figure 3:
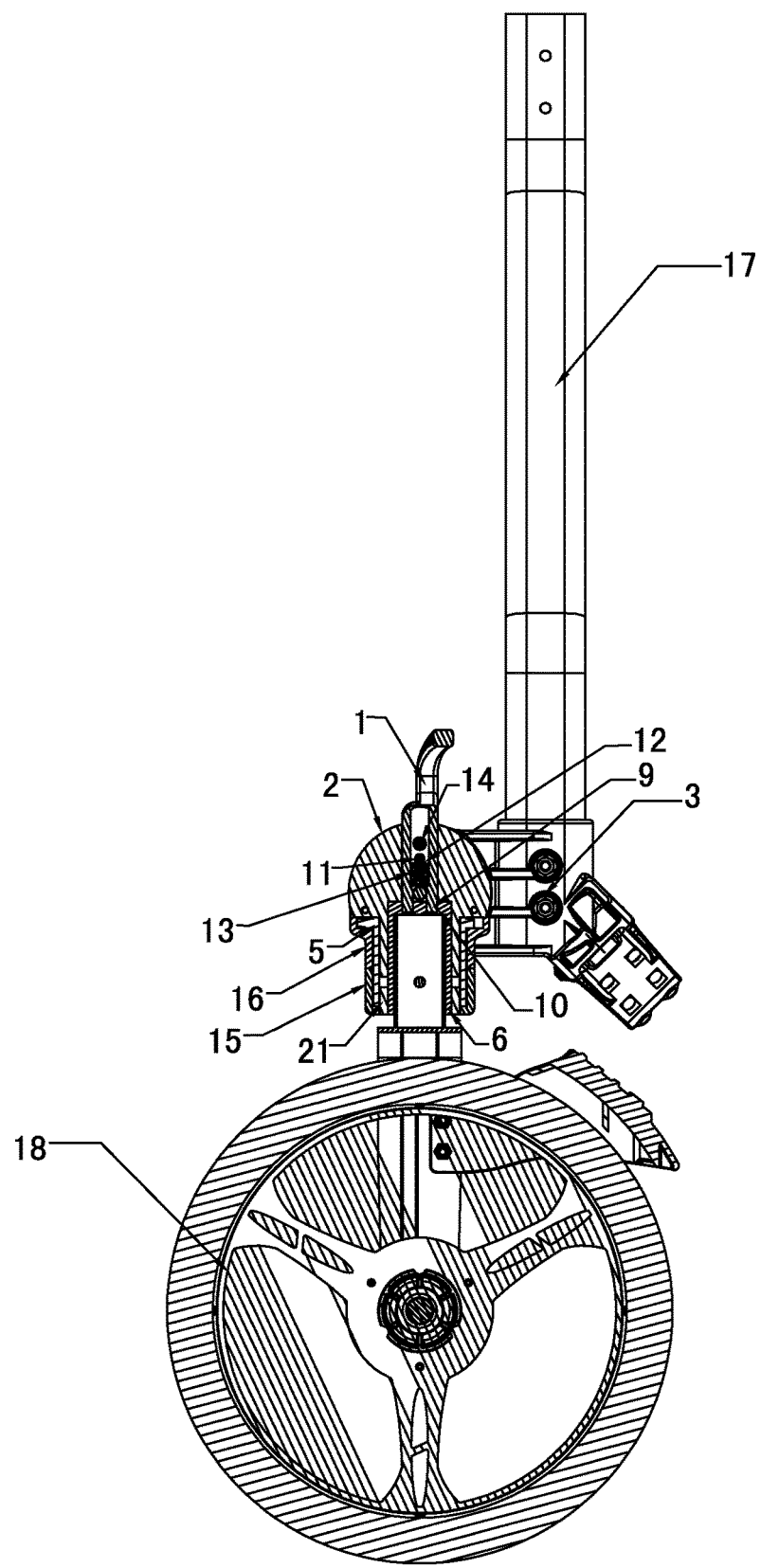
FIG. 3 is a sectional view of a front wheel folding structure of a three-wheeled cart in FIG. 1.
Figure 4:
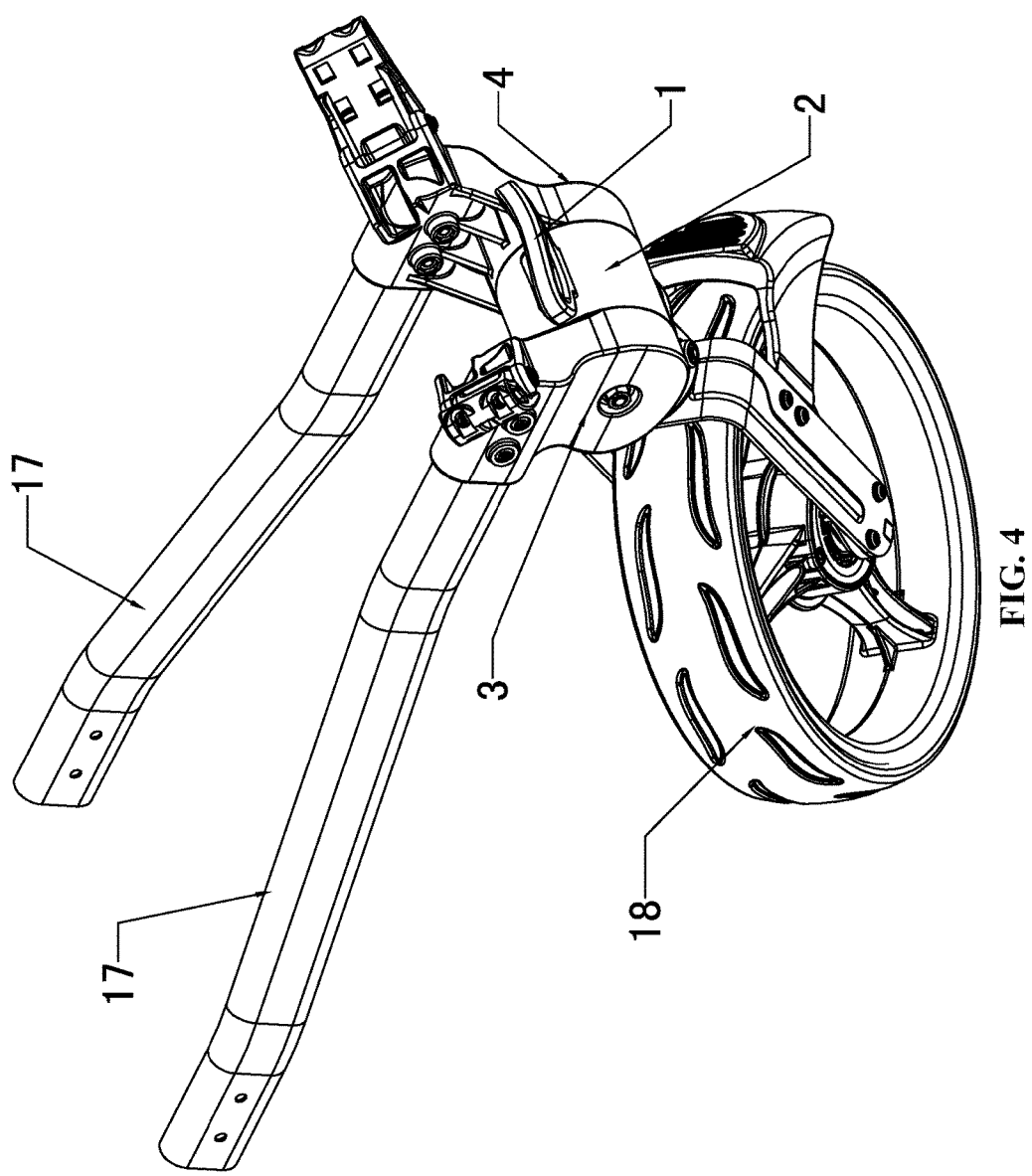
FIG. 4 is a schematic diagram of a front wheel folding structure of a three-wheeled cart in the process of folding in accordance with one embodiment of the invention.
Figure 5:
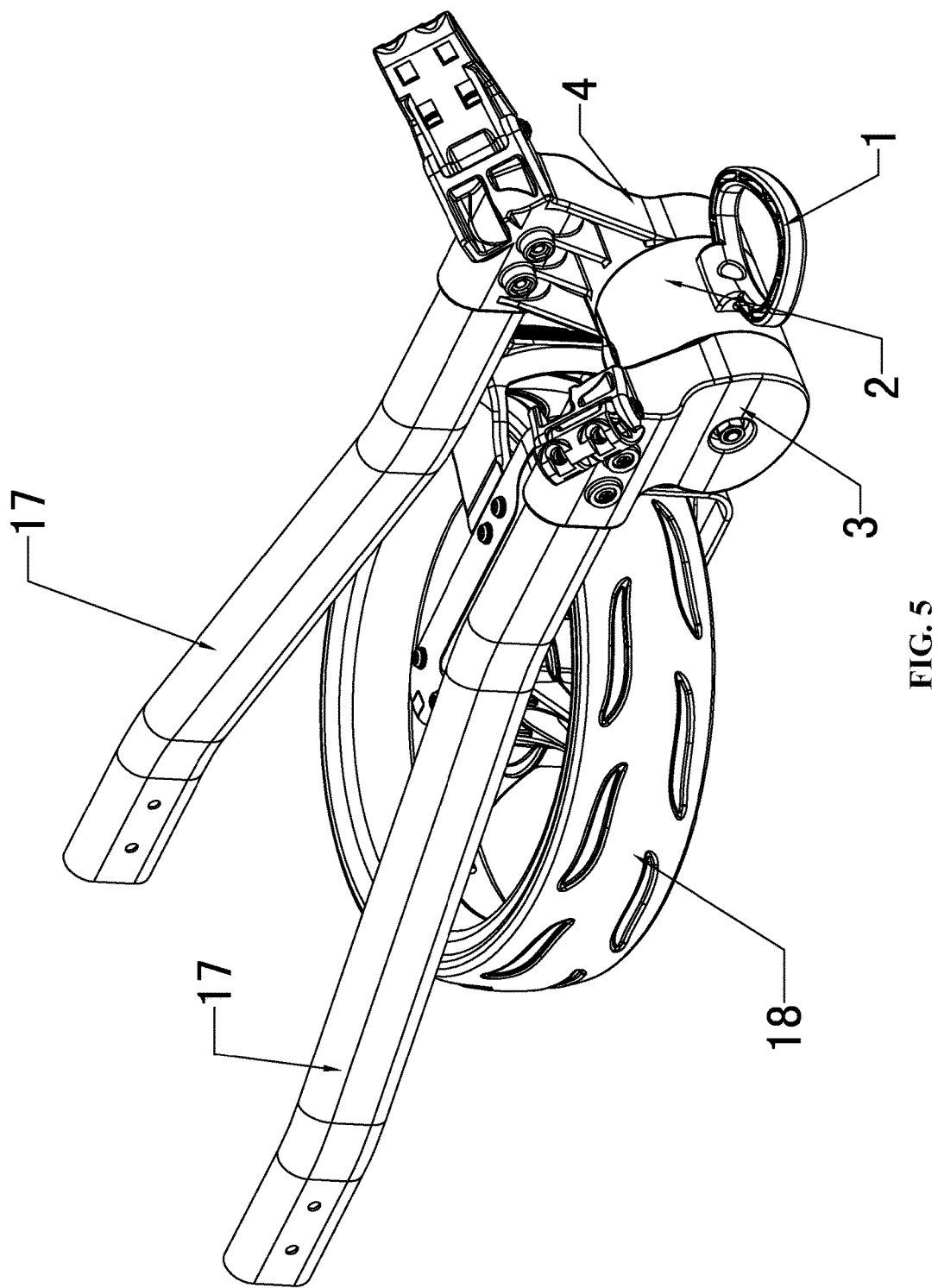
FIG. 5 is a folded state diagram of a front wheel folding structure of a three-wheeled cart in accordance with one embodiment of the invention.
Figure 6:
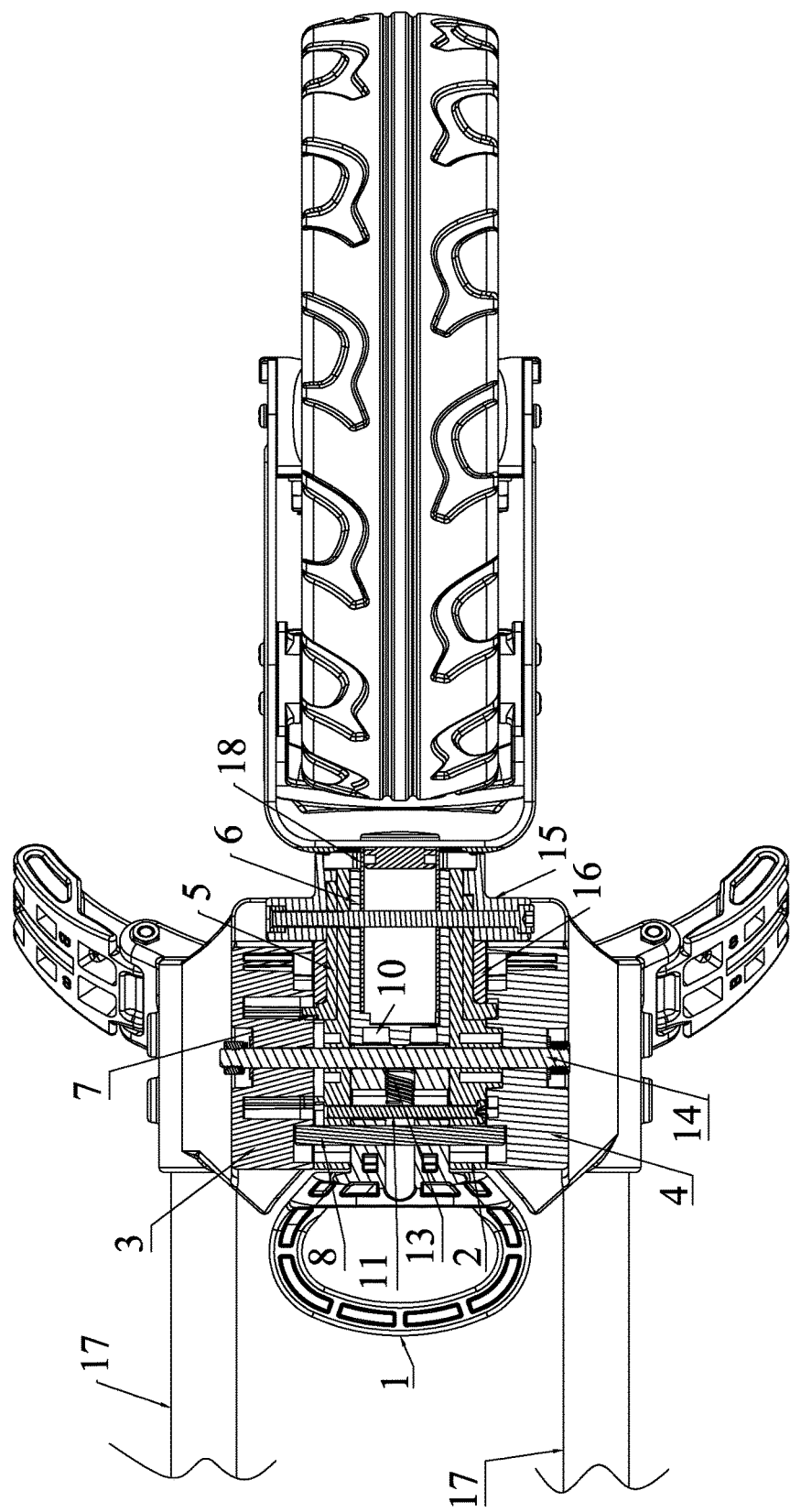
FIG. 6 is a partial sectional view of a front wheel folding structure of a three-wheeled cart in FIG. 1.

To further illustrate the invention, experiments detailing a front wheel folding structure of a three-wheeled cart are described below. It should be noted that the following examples are intended to describe and not to limit the invention.

A front wheel folding structure of a three-wheeled cart, comprises a pull handle 1, a rotational joint 2, a first joint base 3 and a second joint base 4 which are symmetrically disposed at two sides of the rotational joint 2, a first gear 5, and a pipe sleeve 6 of a front wheel rack. The rotational joint 2 is coupled to the first joint base 3 and the second joint base 4. The front part 21 of the rotational joint 2 sleeves the pipe sleeve 6 of the front wheel rack, and the pull handle 1 is disposed at the rear part of the rotational joint 2. The first gear 5 sleeves the front part 21 of the rotational joint 2, and a second gear 7 is disposed in the inner side of the first joint base 3 and is engaged with the first gear 5.

A bayonet pin 8 is fixed on the pull handle 1, and two ends of the bayonet pin 8 are clamped on the first joint base 3 and the second joint base 4, respectively. A fixture block 9 is disposed at the front end of the pull handle 1. A clamping groove 10 is provided at the rear end of the pipe sleeve 6 of the front wheel rack, and the fixture block 9 is clamped in the clamping groove 10; a screw 11 is fixed on the rotational joint 2, the pull handle 1 comprises a strip hole 12, and the screw 11 is received by the strip hole 12 and is adapted to move in the strip hole 12. The pull handle 1 comprises a spring 13; a front end of the spring 13 abuts against an inner wall of the pull handle 1, and a tail end of the spring 13 abuts against the screw 11.

Preferably, the front part 21 of the rotational joint 2 is coupled to the rear part 22 of the rotational joint 2. The rotational joint 2 is coupled to the first joint base 3 and the second joint base 4 via a bolt 14; the first gear 5 is sleeved with a first base cover 15 and a second base cover 16; the first base cover 15 is disposed at a front part of the first gear 5, and the second base cover 16 is disposed at a rear part of the first gear 5.

The gear teeth of the first gear 5 are distributed along a quarter of a circle, and gear teeth of the second gear 7 are distributed along a semicircle.

The working principle of the front wheel folding structure of a three-wheeled cart is summarized as follows. The first joint base 3 and the second joint base 4 are connected to the lower frame 17, and the pipe sleeve of the front wheel rack is connected to the front wheel assembly 18. When the front wheel assembly 18 is in an unfolded state, the spring 13 stays at its initial state, the screw 11 stays at the rear end of the strip hole 12, the fixture block 9 disposed at the front end of the pull handle 1 is clamped in the clamping groove 10 disposed at the rear end of the pipe sleeve 6 of the front wheel rack, and two ends of the bayonet pin 8 fixed on the pull handle 1 are clamped on the first joint base 3 and the second joint base 4, respectively, so that the pull handle 1, the rotational joint 2, the first joint base 3 and the second joint base 4 are relatively fixed. To fold the front wheel assembly 18, the pull handle 1 is first pulled towards the outside of the rotational joint 2, as a result, two ends of the bayonet pin 8 fixed on the pull handle 1 are detached from on the first joint base 3 and the second joint base 4, and the fixture block 9 disposed at the front end of the pull handle 1 is detached from the clamping groove 10 disposed at the rear end of the pipe sleeve 6 of the front wheel rack. The screw 11 moves from the rear end to the front end of the strip hole 12 to compress the spring 13. The rotational joint 2 is rotational in relative to the first joint base 3 and the second joint base 4. Rotate the pull handle 1, the pull handle 1, the rotational joint 2, the first gear 5, the pipe sleeve 6 of the front wheel rack, and the front wheel assembly 18 all turn 180 degrees and are folded under the lower frame 17. In the process of turning, the engaged teeth of the first gear 5 and the second gear 7 are shifted, and the rotation of the first gear 5 drives the front part of the rotational joint 2, the pipe sleeve 6 of the front wheel rack, and the front wheel assembly 18 to rotate. When the front wheel assembly 18 is folded, the front wheel is parallel to the lower frame 17. Then, loosen the pull handle 1, and the spring 13 resets, the fixture block 9 disposed at the front end of the pull handle 1 is clamped in the clamping groove 10 disposed at the rear end of the pipe sleeve 6 of the front wheel rack, and two ends of the bayonet pin 8 fixed on the pull handle 1 are clamped on the first joint base 3 and the second joint base 4, respectively, so that the pull handle 1, the rotational joint 2, the first joint base 3 and the second joint base 4 are relatively fixed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A folding structure of a three-wheeled cart, the folding structure comprising:
    a) a pipe sleeve of a front wheel rack;
    b) a rotational joint;
    c) a first joint base;
    d) a second joint base; and
    e) a locking mechanism;

wherein:
    the first joint base and the second joint base are symmetrically disposed at two sides of the rotational joint;
    the locking mechanism is configured to lock the rotational joint;
    the rotational joint is coupled to the first joint base and the second joint base;
    the rotational joint comprises a front part and a rear part, and the front part is adapted to rotate in relative to the rear part;
    the front part of the rotational joint is connected to the pipe sleeve of the front wheel rack and is sleeved with a first gear, and a second gear is disposed in an inner side of the first joint base and is engaged with the first gear;
    the locking mechanism comprises a pull handle disposed on the rotational joint, a bayonet pin fixed on the pull handle, and a fixture block disposed at a front end of the pull handle;
    two ends of the bayonet pin are clamped on the first joint base and the second joint base, respectively;
    a clamping groove is provided at a rear end of the pipe sleeve of the front wheel rack, and the fixture block is clamped in the clamping groove; and
    a screw is fixed on the rotational joint, the pull handle comprises a strip hole, and the screw is received by the strip hole and is adapted to move in the strip hole.

2. The folding structure claim 1, wherein gear teeth of the first gear are distributed along a quarter of a circle, and gear teeth of the second gear are distributed along a semicircle.

3. The folding structure of claim 1, wherein the pull handle comprises a spring; a front end of the spring abuts against an inner wall of the pull handle, and a tail end of the spring abuts against the screw.

4. The folding structure of claim 1, wherein the rotational joint is coupled to the first joint base and the second joint base via a bolt; the first gear is sleeved with a first base cover and a second base cover; the first base cover is disposed at a front part of the first gear, and the second base cover is disposed at a rear part of the first gear.

* * * * *